US011010991B2

(12) United States Patent
Helms et al.

(10) Patent No.: US 11,010,991 B2
(45) Date of Patent: May 18, 2021

(54) AUTOMATED LOAD AND UNLOAD DETECTION SYSTEM FOR BULK MATERIAL HAULER VEHICLES

(71) Applicant: COMMAND ALKON INCORPORATED, Birmingham, AL (US)

(72) Inventors: Jeremy D. Helms, Laveen, AZ (US); Michael J. Sobel, Annandale, VA (US); Dale L. Sproul, Queen Creek, AZ (US); Jeffrey L. Wheeler, Leesburg, VA (US)

(73) Assignee: Command Alkon Incorporated, Birmingham, AL (US)

( * ) Notice: Subject to any disclaimer, the term of this patent is extended or adjusted under 35 U.S.C. 154(b) by 178 days.

(21) Appl. No.: 16/236,683

(22) Filed: Dec. 31, 2018

(65) Prior Publication Data

US 2020/0211300 A1    Jul. 2, 2020

(51) Int. Cl.
*G07C 5/08* (2006.01)
*H04Q 9/00* (2006.01)
*G01G 9/00* (2006.01)
*G07C 5/02* (2006.01)
*H04L 29/08* (2006.01)

(52) U.S. Cl.
CPC ............... *G07C 5/08* (2013.01); *G01G 9/00* (2013.01); *H04Q 9/00* (2013.01); *G07C 5/02* (2013.01); *H04L 67/12* (2013.01)

(58) Field of Classification Search
CPC . G07C 5/08; G07C 5/02; G07C 5/085; H04Q 9/00; G01G 9/00; G01G 23/3735; G01G 19/12; H04L 67/12
See application file for complete search history.

(56) References Cited

U.S. PATENT DOCUMENTS

| | | |
|---|---|---|
| 4,414,661 A | 11/1983 | Karlstrom |
| 4,682,165 A | 7/1987 | Davis |
| 5,493,694 A | 2/1996 | Vlcek et al. |
| 5,613,196 A | 3/1997 | Barnes et al. |
| 5,719,771 A | 2/1998 | Buck et al. |
| 5,808,907 A | 9/1998 | Shetty et al. |
| 5,815,071 A | 9/1998 | Doyle |

(Continued)

*Primary Examiner* — Brian P Sweeney
(74) *Attorney, Agent, or Firm* — Snell & Wilmer L.L.P.; Kent A. Lembke

(57) ABSTRACT

A system for automatically detecting an operational event for a bulk material hauler vehicle. The system includes a sensor mounted on the bulk material hauler vehicle, which is adapted for hauling a bulk material such as an aggregate. The system further includes a telematics system provided on the bulk material hauler vehicle. The telematics system includes a processor running software (or executing instructions or code) for detecting the operational event (e.g., providing functions of a load and unload detection module or discriminator as described herein). During vehicle operations, the sensor transmits sensor data to the telematics system, and the detecting of the operational event includes retrieving a signature definition for the operational event and then verifying the sensor data meets requirements of the signature definition. In some embodiments of the system, the operational event is loading the bulk material on or unloading the bulk material from the vehicle.

29 Claims, 6 Drawing Sheets

(56) References Cited

U.S. PATENT DOCUMENTS

| | | | |
|---|---|---|---|
| 5,991,615 A | 11/1999 | Coppinger et al. | |
| 6,144,916 A | 11/2000 | Wood, Jr. et al. | |
| 6,212,393 B1 | 4/2001 | Suarez et al. | |
| 6,292,724 B1 | 9/2001 | Apsell et al. | |
| 6,330,499 B1 | 12/2001 | Chou et al. | |
| 6,611,755 B1 | 8/2003 | Coffee et al. | |
| 9,983,048 B1 * | 5/2018 | Meier | G01G 13/00 |
| 2012/0084047 A1 * | 4/2012 | Vesterdal | B65G 67/00 |
| | | | 702/141 |
| 2012/0143434 A1 * | 6/2012 | Donnelli | B60P 1/045 |
| | | | 701/33.4 |
| 2012/0228038 A1 * | 9/2012 | Slifkin | G01G 23/3735 |
| | | | 177/136 |
| 2017/0370764 A1 * | 12/2017 | Xu | G01G 9/00 |

\* cited by examiner

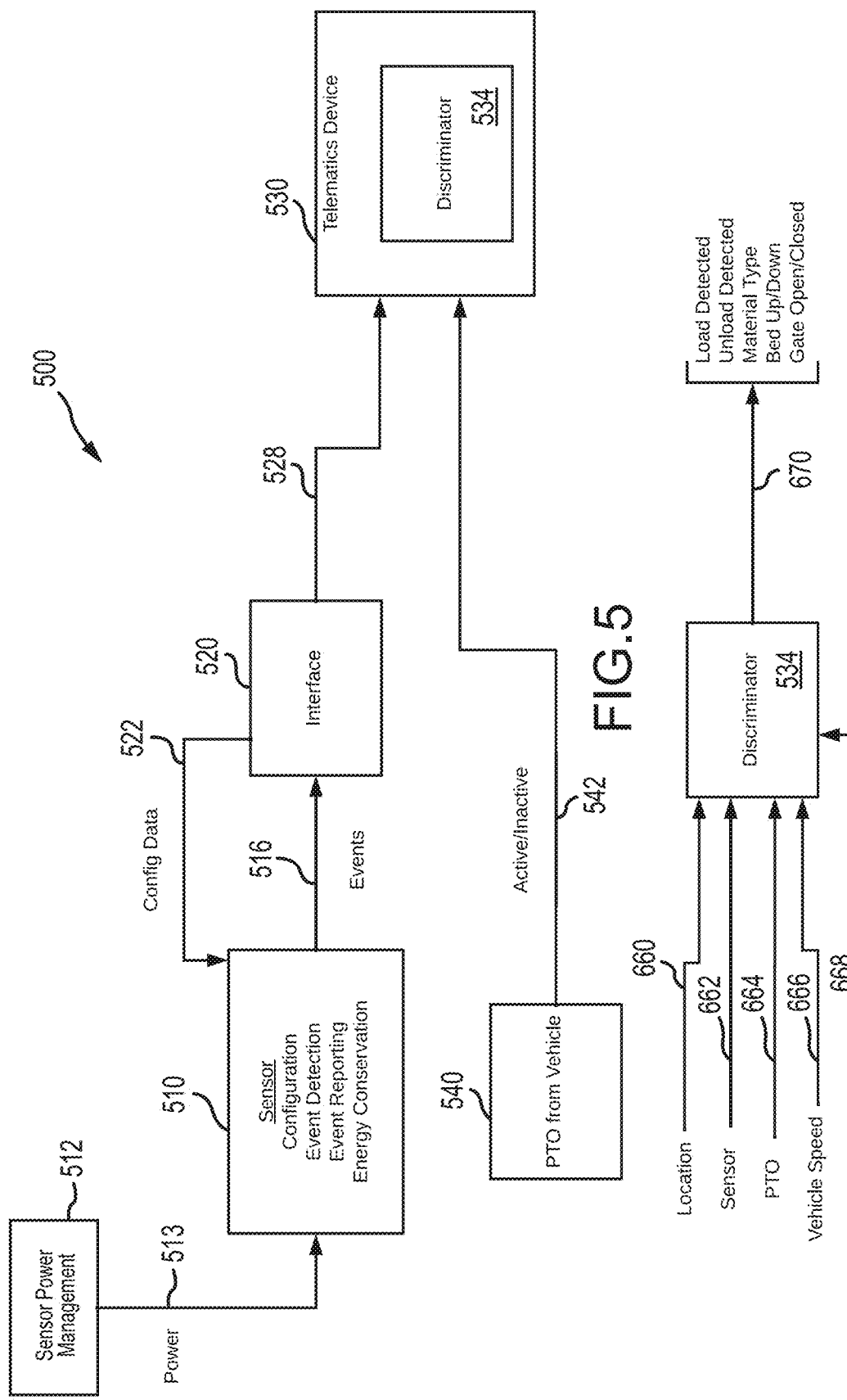

AUTOMATED LOAD AND UNLOAD DETECTION SYSTEM FOR BULK MATERIAL HAULER VEHICLES

BACKGROUND

1. Field of the Invention

The present invention generally relates to monitoring and management of bulk material hauler vehicles in the construction and other industries and, more particularly, to system (and associated method) for automating the detection of load and unload events for a bulk material hauler vehicle such as a truck used to haul aggregate.

2. Relevant Background

Operators of fleet vehicle businesses, including those in the construction materials delivery industry, have an ongoing need to know where each vehicle in the fleet is located and what it is doing in order to make decisions on how to best use the vehicle most efficiently. In particular, material producers and hauling companies have a need to know when and where their bulk material hauler vehicles are loading and unloading material.

Many technologies have been developed and implemented to accurately and automatically track the location of the vehicle. For example, vehicle locating or tracking systems have been developed using Global Positioning System (GPS) satellite information. These tracking systems are highly accurate where line of sight (LOS) conditions exist. The vehicle locating or navigation systems have also more recently been enhanced to also provide accurate locations of the vehicle even when LOS conditions are lost such as when the vehicle is operating on city streets where multi-story building are present. This location information is relied upon as input to various supply chain optimization software and distribution scheduling (or constructions logistics) software tools presently available in the market.

However, it remains difficult to identify vehicle operating events including loading and unloading of materials. Presently, it is common to rely upon communications with or actions of the driver to report when material is loaded and unloaded from a particular truck. For example, a driver may be required to press a button or check a status box at each stage of operation such "load" and "unload," but reliance upon the driver is fraught with human error.

Another solution is to use geofence zones at known loading and unloading locations including using GPS devices to detect when a vehicle stops in one of these locations. However, whether the truck is loaded or unloaded while at the location remains guesswork. Some vehicle monitoring systems use equipment and procedures on bucket loaders that report when they place material into a vehicle. This information can give a vehicle operator a loading event but not an unloading/dumping event, and it is only available at some facilities such as properly-equipped quarries, mines, and the like. Some vehicles are equipped with devices for monitoring the power take-off (PTO) signal to report the raising and lowering of a dump bed. This can identify an unloading event or operation, but it requires an assumption that the dump bed had been previously been loaded. PTO-based monitoring technology also does not identify loading of material, and it is often ineffective due to faulty PTO wiring.

Hence, there remains a need for a universally applicable solution that identifies when (and where) bulk materials such as aggregate, cement, or other construction material is loaded onto a vehicle and also identifies when (and where) such loaded bulk materials are later unloaded. Preferably, such a system would operate to automatically identify loading and unloading events without any reliance upon a driver of the bulk material hauling vehicle to avoid human error.

SUMMARY

The inventors recognized there was a need in the construction materials delivery industry for technology that would enable material producers and hauling companies to identify when and where their vehicles are loading and unloading material without reliance upon their drivers. To this end, a system, and associated method, was created by the inventors that provides automatic load and unload detection for bulk material hauling vehicles. The system is configured for use with a wide variety of such vehicles including conventional end and side dump trucks, belly dump trucks, and tanker-type vehicles, and the term "bulk material" is intended to include nearly anything that may be loaded and unloaded upon such vehicles such as aggregate, sand, rock, dirt, cement, tear-down materials, and the like used or hauled in the construction and building materials industry.

The new system has many useful applications including, but not limited to: (a) monitoring dump truck beds for true load events (i.e., material dropped into bed) and unload events (i.e., bed lifted/tipped until gravity forces material to drop out); (b) monitoring belly dumps (i.e., material added from above for loading and dropped through an opening underneath for unloading); and (c) monitoring blower systems on tanker-type vehicles to determine when material is blown in from an outside storage tank or other material source (for loading) and when material is blown out at the delivery location (for unloading).

More particularly, a system is provided for automatically detecting an operational event for a bulk material hauler vehicle. The system includes a sensor mounted on the bulk material hauler vehicle, which is adapted for hauling a bulk material such as an aggregate. The system further includes a telematics system provided on the bulk material hauler vehicle. The telematics system includes a processor running software (or executing instructions or code) for detecting the operational event (e.g., providing functions of a load and unload detection module or discriminator as described herein). During vehicle operations, the sensor transmits sensor data to the telematics system, and the detecting of the operational event includes retrieving a signature definition for the operational event and then verifying the sensor data meets requirements of the signature definition.

In some embodiments of the system, the operational event is or involves loading the bulk material on or unloading the bulk material from the bulk material hauler vehicle. In such embodiments, the signature definition includes a first definition for the loading of the bulk material and a second definition differing from the first definition for the unloading of the bulk material. The bulk material hauler vehicle may be selected from a plurality of differing types of vehicles, and the signature definition is unique to each of the differing types of vehicles. Particularly, the differing types of vehicles can be selected from an end dump truck, a side dump truck, a belly dump truck, and a storage-tanker type truck. Further, the bulk material may be selected from a plurality of differing types of materials, and the signature definition can be unique to each of the differing types of materials.

In some implementations of the detection system, the sensor is adapted to only transmit the sensor data when a sensed parameter exceeds a predefined threshold. Further, the sensor data may include a signal with a waveform over a time period, and the verifying of the sensor data may involve comparing the waveform to the signature definition. In such cases, the sensor senses vibration of a portion of the bulk material hauler vehicle, the signature definition includes a threshold amplitude of vibration over a minimum duration, and the verifying of the sensor data involves determining the waveform has one or more amplitudes exceeding the threshold amplitude and that the waveform has a duration exceeding the minimum duration. In such cases, the portion of the bulk material hauler vehicle may be a bed or a storage tank, and the bulk material may be aggregate such as one made up of or including sand, dirt, cement, asphalt, or rock. Still further, the detecting of the operation event step may include retrieving additional data selected from the group consisting of vehicle location, vehicle speed, power take-off (PTO) status, and geofence status, and the detecting step may further include processing the additional data to validate or invalidate the operational event (e.g., to determine if the vehicle location matches the identified operational event, to determine if the vehicle speed indicates the vehicle was stopped or travelling slow enough for a load or unload of material, and so on).

BRIEF DESCRIPTION OF THE DRAWINGS

FIG. 5 is a functional block diagram of a load and unload detection system of the present description such as may be used in the vehicle of FIG. 1 or system of FIG. 2;

FIG. 6 provides a data flow diagram for the discriminator or detection module of the system of FIG. 5.

DETAILED DESCRIPTION

Briefly, an automatic load and unload detection system is described that is especially useful in bulk material hauler vehicles. The system is useful for nearly any vehicle used in the construction and building industries including dump trucks (conventional rear, side, and bottom/belly dump designs) used to haul aggregate, cement, and other bulk construction and build materials and including tanker-type trucks used to haul materials that are loaded into and unloaded from a storage tank via blower systems.

The new system is designed to be provided on a vehicle typically with a sensor on or near the bed or portion of the vehicle in which the material is loaded (and then unloaded) and with a telematics system in the cab of the vehicle that processes sensor data and communicates with a vehicle management hub or dispatcher system. The system uses sensor technology to detect vibration or other movement of the surface to which the sensor is attached. The system uses a software package or application (e.g., a load and unload detection module/algorithm run by a processor of the telematics system) to process or filter the sensor data to isolate specific readings (e.g., ones with a signature identifying a load or an unload event) that indicate a relevant event has occurred from or over more common events (or vehicle operations) and background noise present in the sensor data.

Prototyping of the system with a sensor configured for seismic sensing provide the usefulness of the new system. In one test, a shock sensor, such as may be used for an automobile's alarm shock sensor, was used that included a sensitivity adjustment and that provided usable output for a telematics device/system. In the test, the sensor was placed in the bed of a truck and rigidly fastened down to the truck bed. When the sensitivity was properly adjusted, the prototype system was able to determine when any item was placed into the bed of the truck (e.g., when material made impact with the inner surfaces of the bed). In this example, the sensitivity adjustment of the sensor was used to filter out common or non-impact noise, but, in other embodiments, such noise may be filtered out by the processing software alone and/or with some filtering provided by the sensor (e.g., only trigger a communication of sensor data to the telematics system and its software when a signal waveform exceeds a threshold value). In this way, the sensor of the prototype system did not trigger with engine noise, general road noise, or even speed bumps, and only triggered with larger bed impacts and vibrations such as would occur with material placement or loading into the truck bed (and also with later unloading of this material from the bed).

Figure 1:
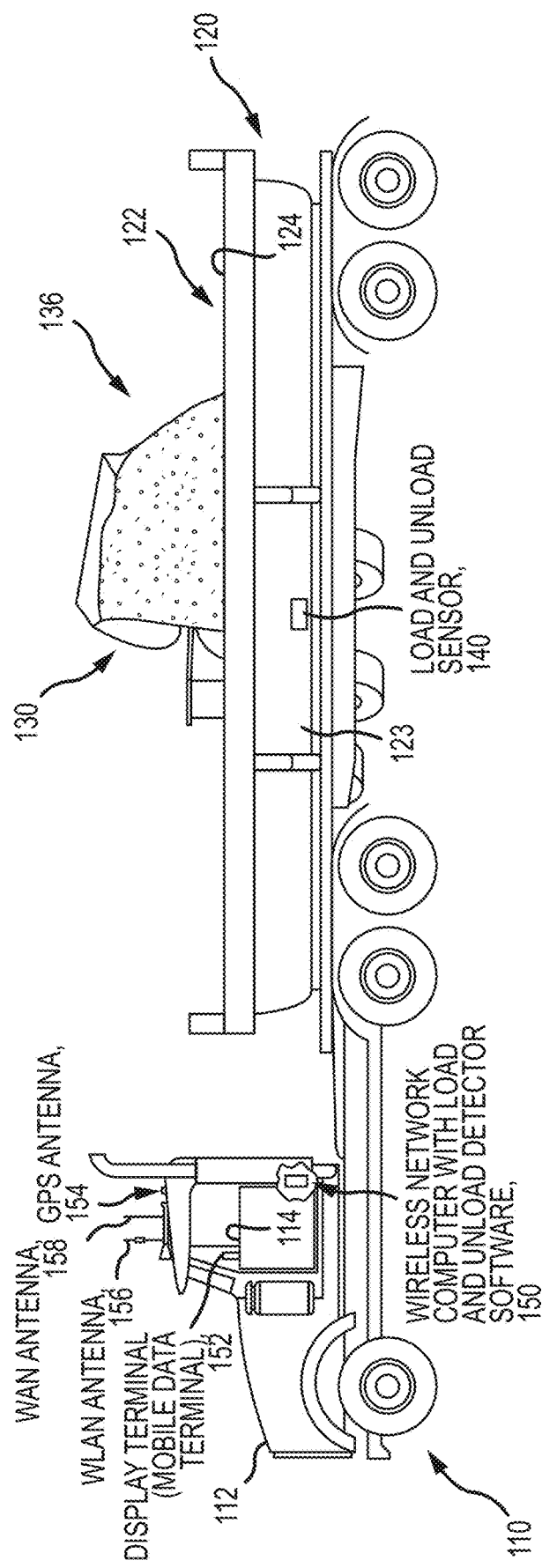
FIG. 1 illustrates a vehicle with an automatic load and unload detection system of the present description during loading operations.

FIG. 1 illustrates a vehicle, e.g., a dump truck, 110 with an automatic load and unload detection system of the present description during loading operations. The vehicle 110 includes a tractor 112 adapted for towing a trailer 120 used to haul or delivery bulk materials. Particularly, the trailer 120 includes a bed 122 that is open at the top to expose an inner bed surface 124, and, during fill or loading operations, a front-end loader 130 is operated to dump or place bulk materials (e.g., aggregate or the like) 136 into the bed 122. The material 136 is dropped or gravity fed such that it strikes the surface 124 of the bed with a relatively large impact force that caused the bed 122 to vibrate. The loading with the front-end loader 130 is repeated until a desired amount of bulk material is loaded into the bed 122.

The automatic load and unload detection system is mounted on or provided in the truck 110. This system includes a load and unload sensor 140 that is rigidly mounted on an outer surface 123 of the bed 122 so that it can sense vibrations or other movements of the bed 122. The specific mounting location may vary to implement the system as long as the sensor 140 is not isolated from vibrations (or other movements being measured), with some useful locations being on the outer surface 122 in areas directly opposite the inner surfaces 124 upon which the materials 136 are dropped or placed by the loader 130 during loading.

The sensor 140 operates to sense vibrations and/or other movements of the bed 122 and, in response, to communicate sensor data to the telematics system provided in or on the cab 114 of the tractor 112. The sensor 140 may be accelerator-type sensor (e.g., a G-Link-200 (available from LORD Sensing Systems) or the like that may be magnetically mounted (as quick mount is useful since not all vehicles will be fleet vehicles or company owned) and is wireless) such that its output is an accelerometer signal with one or more waveforms associated with differing operations of the vehicle 110 (e.g., sensor output may be a time series graph to allow a signature over a time period to be defined and later identified in sensor output). Other embodiments may use a shock sensor, a seismic sensor, or nearly any other type of sensor useful for sensing bed vibrations or movements. The sensor 140 may be wirelessly linked to the telematics system (such as with wireless network computer 150) or be connected for wired communications.

The telematics system is shown to include a wireless network computer 150 that is configured for wireless communications with a network hub or fleet dispatch system (not shown in FIG. 1 but seen in FIG. 2) and for wired or wireless communications with the sensor 140. The wireless network computer 150 includes a processor(s) that executes code/instructions or runs software that is adapted to process the sensor data to identify load and unload events, with a load event shown in FIG. 1. The computer 150, in turn, operates to transmit messages to the network hub or fleet dispatch system that indicate when and where the load or unload event occurred along with, in some cases, other data related to the vehicle 110, the driver of the vehicle 110, and/or the material 136 (e.g., the number of load operations, the volume of the material 136, the type of the material 136, and the like).

To allow the computer 150 to determine the vehicle's location, the telematics system includes a GPS antenna 154. Wireless communications are achieved, in this example, with the WLAN antenna 156 (e.g., any useful wireless local area network or WLAN antenna) and the WAN antenna 158 (e.g., any cellular or satellite antenna useful for wide-area network or WAN communications), and the telematics system is further shown to include a display terminal 152 (which is optional as the present system may work without driver involvement in some applications) for displaying information to the driver of the vehicle 110 and for allowing the driver to enter information or initiate telematics system's operations. As discussed in more detail below, the wireless network computer 150 and the telematics system of the vehicle may operate to provide communications as is known in the materials delivery/hauling industry such as described in detail in U.S. Pat. No. 6,611,755, which is incorporated herein in its entirety by reference. Further, the telematics system may communicate with a similar system on the loader 130 to pull data about the loader or loader operator such as GPS data, loaded materials, and loaded volume or weight (or number of loader dumps), and this loader-provided data may be included in event reporting communications from the telematics system of the vehicle with the load and unload detection system and a remote hub system or dispatcher/fleet management system.

Figure 2:
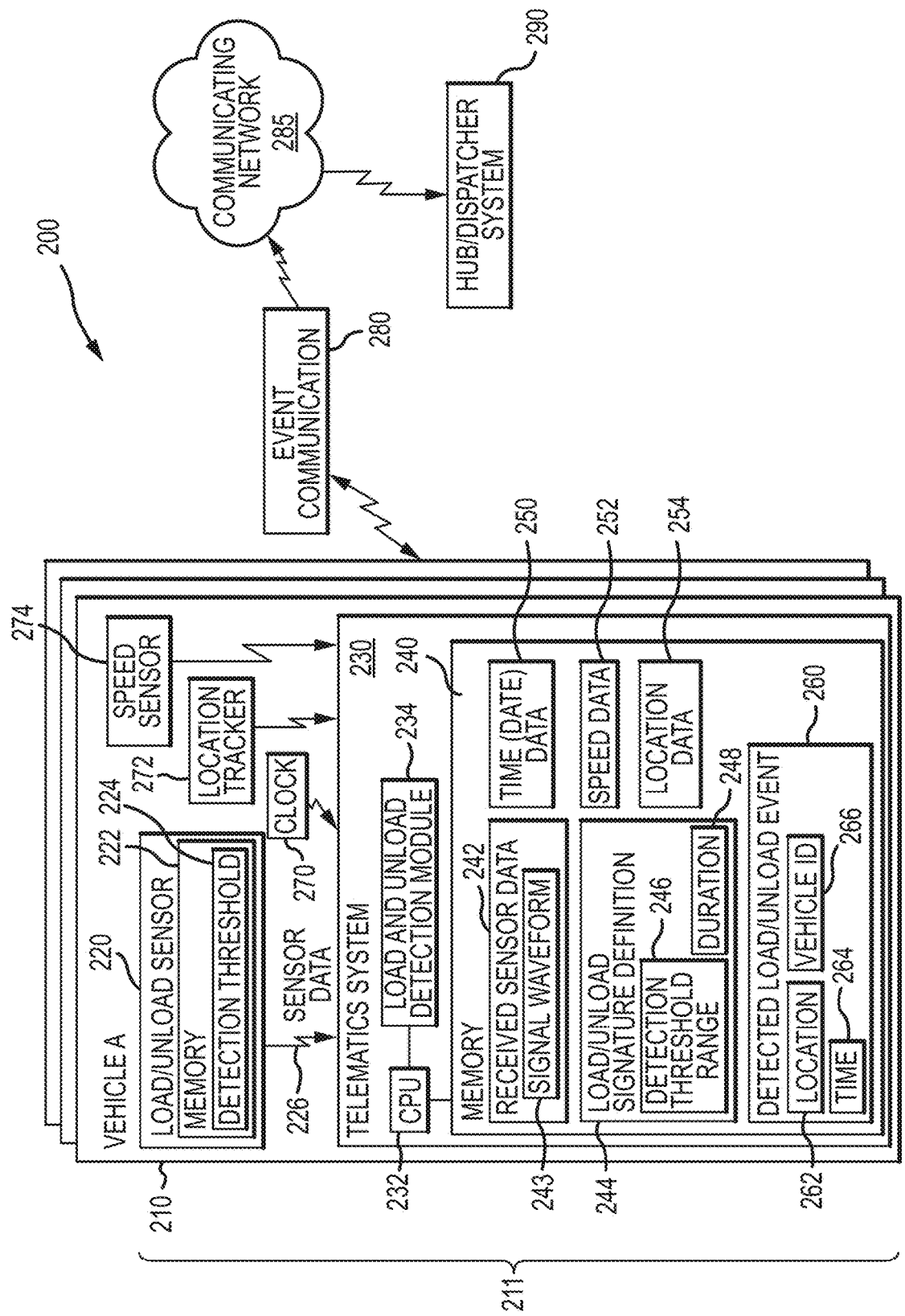
FIG. 2 is a functional block diagram of a vehicle management or tracking system with vehicles each configured according to the present with an automatic load and unload detection system.

FIG. 2 is functional block diagram of a vehicle management or tracking system 200 with vehicles 210 each configured according to the present with an automatic load and unload detection system 211. The detection system 211 includes a load and unload sensor 220, which as discussed above is placed on the vehicle 210 at a location and with a mounting type that allows it to sense when a load or an unload event occurs such as upon a bed of a dump truck. The sensor 220 may be a conventional vibration sensor that is commercially available but, in some embodiments, includes memory 222 that stores a detection threshold 224 (or that allows sensitivity to otherwise be adjusted to filter out background noise). The sensor 220 may further include processing capabilities to determine when a sensed vibration or other movement exceeds the preset threshold 224 and, in response, to transmit, in a wired or wireless manner as shown at 226, sensor data to a telematics system 230 in the cab of the vehicle 210. The sensor data may include a sensor signal (with a particular waveform) for a period of time that at least includes data collected beginning with the triggering measurement (e.g., upon initial impact that caused a vibration of the bed over the threshold vale 224). In some embodiments, the threshold 224 is provided by a range of values such as a minimum value and a maximum value so that spikes or very large values are also filter out, e.g., to eliminate vibration that may occur due to a pothole or the like or that may be associated through testing with events not associated with loading or unloading of the vehicle.

Figure 3:
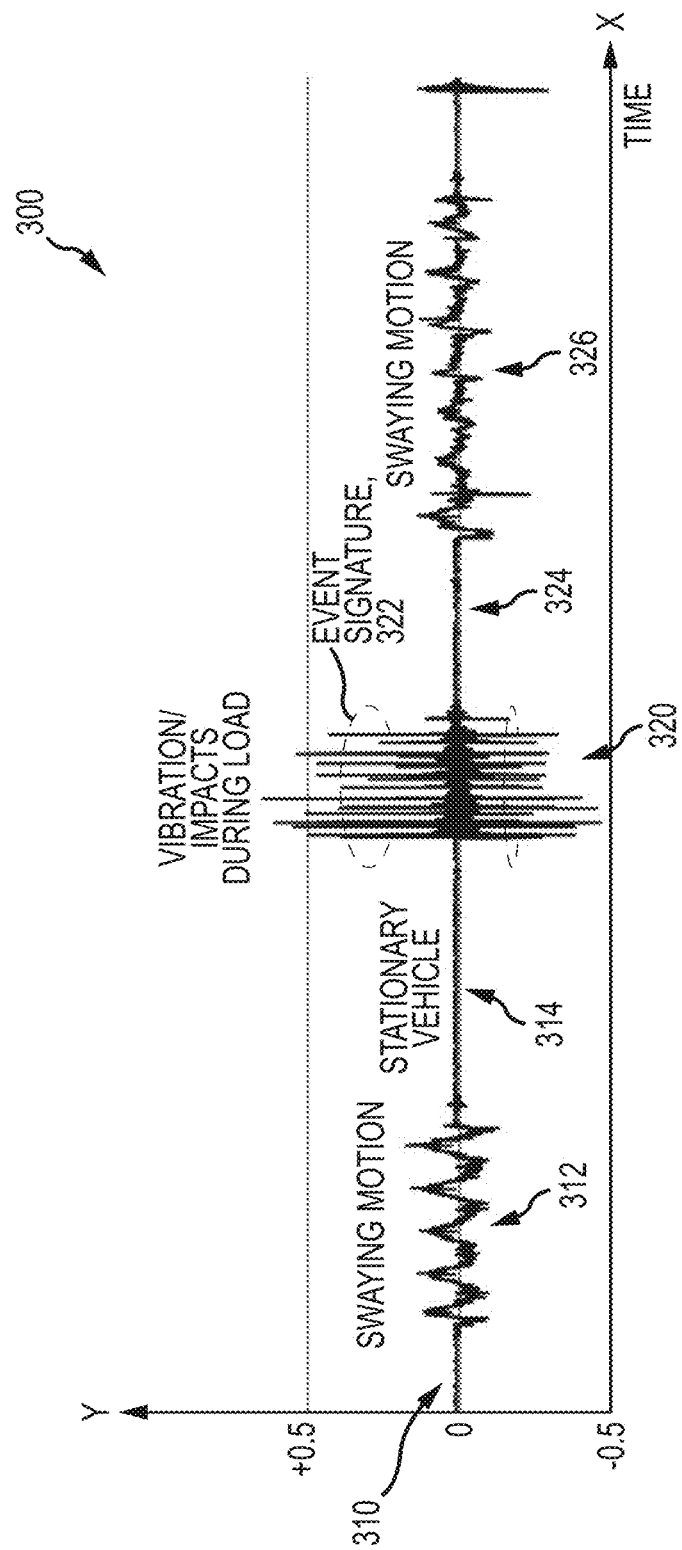
FIG. 3 is a graph of sensor data or output from testing of one detection system prototype.

As part of the detection system 211, the telematics system 230 includes a processor 232 that executes code/instructions and/or runs software or algorithms to provide the functionality of a load and unload detection module 234 (which may be considered or include a discriminator discussed below with reference to FIG. 3). The telematics system 230 also includes memory 240 managed and accessed by the processor 232 during operations of the module 234. As shown, the memory 240 stores at 242 sensor data received from the sensor 220 for processing by the module 234, and this data 242 often will include a sensor signal (or signal waveform or a signal with a particular waveform) 243 for a period of operations of the sensor 220.

The memory 240 is also shown to store a load and unload signature definition 244, which is shown as a single definition but in many applications a load signature and a separate and different unload signature may be provided in memory 240. The signature definition 244 may include a detection threshold range 246 along with a duration setting 248. During operations of the system 200, the module 234 may process the signal waveform 243 to verify it (or a subsection of such a signal) has peaks (measured data values) within the detection range 246 and that such peaks repeat (at least periodically or at some predefined frequency) for at least the duration 248 (e.g., a relatively small duration for a load event such as 0.25 to 5 seconds or the like and a relative longer duration for unloading such as 2 to 10 seconds or the like). As discussed above, the sensor 220 may also perform some of this filtering of sensor data so as to avoid having to communicate sensor data 226 on an ongoing basis, which would significantly shorten sensor life when it is battery powered, and to reduce risks of false determinations of a loading or unloading event.

The module 234 may also perform other testing of the sensor data 242 to verify whether the sensor data is a load or unload event. This further processing/testing may include processing output or speed data 252 from a speed sensor (e.g., a vehicle speedometer) 274 to determine if the vehicle 210 was stopped or traveling at a speed associated with a loading or unloading event. Typically, a vehicle 210 will be stopped or at least traveling less than a maximum speed (e.g., less than 5 mph, more typically less than 3 mph, and even more typically less than 1 mph) during material loading and unloading. If not at the time of collection of the sensor data, the module 234 may determine that the sensor data 242 does not include a signal waveform indicating a load or unload event (e.g., the sensor data 226 was triggered, in this case, inappropriately). Other further filtering/processing may include comparing the location data 254 from a location tracker 272 with a set of expected load and unload locations or sites. If the location does not fall within an expected location or site, the module 234 may perform additional testing of the sensor data or flag the location in the event communication as a possible false loading or unloading event (or one that has occurred at an unexpected location requiring additional investigation such as communications with the driver of the vehicle 210).

Upon detection of a loading or unloading event, the module 234 may create a file or record 260 for the event that identifies whether it was a load event or an unload event. Further, the module 260 may store information in memory 240 for the event 260 including the location 262 of the vehicle 210 during the event. This may be defined by information (shown stored in memory at 254) provided by a location tracker 272 (e.g., a GPS antenna and/or similar vehicle locating devices). The module 234 may also store a time 264 of the event (start time, stop time, or both) provided by output (shown in memory 240 at 250) of a clock 270 (which may be part of the telematics system 230 or a separate component on vehicle 210). Further, the module 234 may provide the vehicle ID 266 with each event record 260. The module 234 may (or a communications manager of telematics system 230) may cause the telematics system 230 to transmit a message or event communication 280 wirelessly over a communications network 285 to a hub or dispatcher system 290 for further use in tracking and managing the vehicles 210 in performing bulk material hauling and/or delivery.

The load/unload signature definition 244 often will be unique for each vehicle design and, in some cases, for each type of bulk material that is loaded into and unloaded from the vehicle. For example, testing may be performed with each type of vehicle in a managed fleet or that is expected to use the detection system of the present description, and signature definitions created for each vehicle type (e.g., one loan and one unload signature for a conventional dump truck, a second pair of signatures for a belly dump truck, and a third pair of signatures for a tanker-type truck). The signatures may even differ among manufacturers of a single type of truck. Further, the signature definitions may be unique to the types of bulk materials such as for a first type of vehicle a pair of signature definitions for aggregate, a second pair of signature definitions for cement, and so on. Still further, the sensor type will affect the sensor data and event detection, and unique signature definitions will be provided based on tested outputs from each type of sensor (and even different models of the same type of sensor in some cases) during bulk material loading and bulk material unloading. Still further, the method in which the material is loaded onto the vehicle may also affect the sensor output during loading and, hence, different signature definitions may be created to help the module 234 accurately identify loading of particular bulk materials with each loading technique or technology.

At this point in the discussion, it may be useful to discuss representative output signal or sensor data from a typical load and unload detection sensor that may be included in a detect system of the present description (such as sensor 140 of FIG. 1 or sensor 220 of FIG. 2). FIG. 3 illustrates with graph 300 exemplary output of a vibration sensor that is mounted upon a bed of a dump truck during its operations. Particularly, the sensor signal or output 310 includes sections with waveforms 312, 326 associated with vibrations and/or movement of the bed (and the sensor) while it is swaying when the truck is being driven to and from a load location or site. The waveforms 312, 326 have relatively lower peaks associated with smaller magnitude vibration measurements (e.g., less than about 0.25 g in this case). The sensor signal or output 310 also includes sections with waveforms 314 and 324 that are generally flat when the truck is not moving and the bed is stationary prior to and after, respectively, a loading operation.

Further, the sensor signal or output 310 includes a section with a waveform 320 that is obtained during loading the bed of the dump truck with bulk material (i.e., dropping material in from a front-end loader in this test case). The waveform 320 has higher peaks or greater repeated values of measured vibration (e.g., greater than about 0.25 g or in the range of 0.3 to 0.6 g), and a load event signature definition (shown graphically with dashed box 322) may be defined from this waveform 320 to have a duration that is some length of time less than the actual loading operation (to capture all load events) such as 75 percent of the measured duration of waveform 320. The load event signature definition may have a threshold value for measured vibrations (such as 0.25, 0.3, or 0.4 g) or the peaks may be set to fall within a range (e.g., 0.25 to 0.6 g or the like) over the duration of the signature waveform. By carefully defining the signature 322, it can be seen that a detection module can be used to filter out both the swaying motions associated with waveforms 312 and 326 and also waveforms 314 and 324 associated with a stationary truck and bed while accurately identifying the load event associated with signal section and its waveform 320 due to its complying with the parameters of the load event signature 322. In the graph 300, the swaying motion waveforms 312, 326 is typical of a vehicle during engine idle and/or common motion while driving. Loading (and unloading) events corresponding to waveform 320 are more violent and show drastically higher amplitude.

Figure 4:
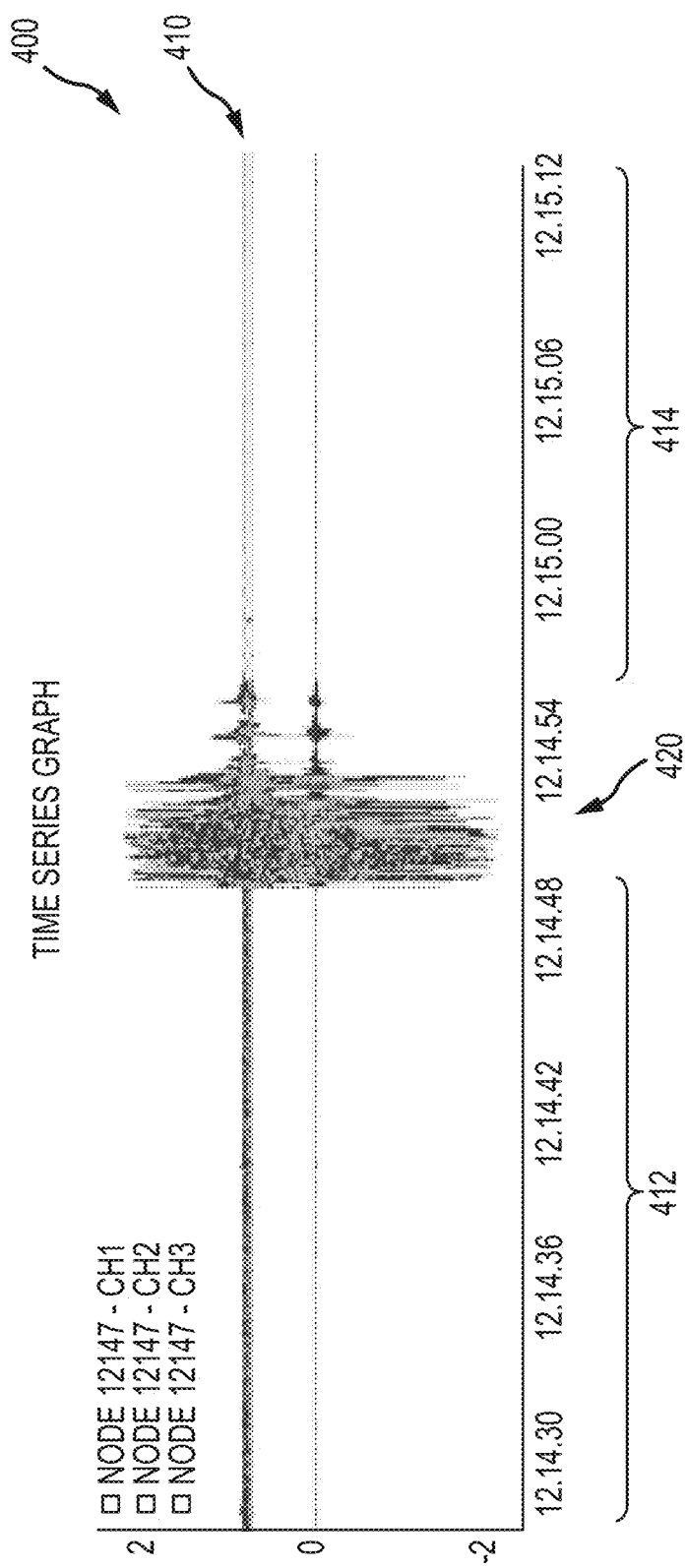
FIG. 4 is graph of sensor data or output from testing of a detection system prototype with a dump truck of the type shown in FIG. 1.

FIG. 4 is graph of sensor data or output from testing of a detection system prototype with a dump truck 100 of the type shown in FIG. 1. In this case, the sensor data or signal 410 includes waveforms (or sections with waveforms) 412, 414 obtained when the truck was idling as it waited for a load of bulk material to be dumped into its bed and when the bed became calm again as the truck continues to idle waiting for a next bucket load of bulk material to be dropped into or loaded into the bed of the truck on which the sensor is mounted. The sensor data or signal 410 further includes a waveform (or section with a waveform) 420 obtained or sensed by the sensor while a bucket full of bulk material is dropped into the bed of the truck (see FIG. 1 showing such a loading event).

The waveform 420 can be used to create a load event signature definition as discussed above for a detection system that includes this sensor configuration, this type of truck, and, optionally, this type of material (and/or this loading technique and/or equipment) such as with defining a threshold value or threshold range for waveform amplitudes (or peaks) to filter out waveforms 412, 414 and other non-load (or unload) events (such as swaying movements) and such as with setting a duration for the signature that is some length of time less than the duration of waveform 420.

FIG. 5 is a functional block diagram of a load and unload detection system 500 of the present description such as may be used in the vehicle 100 of FIG. 1 or system 200 of FIG. 2. The system 500 includes a load and unload sensor 510 outputting sensor data or signals corresponding to events 516 to a communications interface 520. The interface 520 is operable to provide configuration data 522 to configure the sensor 510, which is configured for event detection, event reporting, and energy conservation. The sensor 510 receives power 513 from sensor power management 512 that may have one or more inputs such as, but not limited to, an onboard battery, an energy harvester, vehicle power, and the like. The interface 520 provides a wired or wireless communication link 528 between the sensor 510 and a telematics device/system 530.

The telematics device 530 (as discussed above) includes (e.g., runs software to provide a) discriminator (or detection module) 534. The discriminator processes the sensor output or sensor-provide event data 516, and it may do so in view of active/inactive signals 542 from an operation sensor/gauge 540 on the power take-off (PTO) of the vehicle. FIG. 6 provides a data flow diagram for the discriminator or detection module 534 of the system 500 of FIG. 5. Particularly, FIG. 6 shows that the discriminator 534 may take as input: (a) location data 660; (b) sensor data or signals 662; (c) PTO active/inactive signals 664; (d) vehicle speed data 666; (e) a geofence status 668; and (f) ticket/job information (not shown in FIG. 6 but is information sent to the telematics device by the remote dispatch system that can tell the system when and where (and from whom) to collect a load, what the load is supposed to be (material type and approximate amount of material, for example), and where (and to whom) to deliver the load, and just the fact of receiving a ticket can serve as a clue to expect a load event soon). This input is processed by the discriminator to generate event output/communications 670 including one or more of the following: (a) load detection; (b) unload detection; (c) material type; (d) bed up or down status; and (e) gate open or closed status.

All the components in the system 500 typically would be installed on a bulk material hauling vehicle, which is not shown in FIG. 5 but understood from FIG. 1. The telematics device 530 often will be positioned inside the cab of the vehicle where the driver sits, while the other components of system 500 are at the back of the truck and/or on an attached trailer operating to send their collected information or data up to the telematics system 530 in the cab as needed. Note, some embodiments of the system 500 may omit the PTO operation sensor/gauge 540. Also, it should be understood that the sensor power management 512 may take wide variety of forms to power the sensor 510. For example, the sensor power management 512 may include one or more batteries and/or may include an energy harvester configured to tie into an existing power cable such as one feeding a brake light or the like. Other implementations may include a solar energy collection device or use an energy harvesting system using a piezoelectric solution or technology to power 513 the sensor (e.g., see www.analog.com/en/teclmical-articles/robust-energy-harvesting-system-for-wireless-sensors.html, which is incorporated herein by reference). Further, the interface 520 may take a number of forms to implement the system 500. Some planned systems 500 may include a low-power wireless communications such as Bluetooth Low energy, ZigBee, or the like. Other embodiments, though, may configure the interface 520 to send data 528 over a wire with specially adapted truck-to-trailer cable interconnects to avoid complexities of wireless communications (including pairing and battery life of the sensor 510).

As seen in FIGS. 5 and 6, the system 500 includes a telematics device 530 that is adapted to track both the location of a vehicle and operational events affecting/using the vehicle including loading and unloading of bulk material in (or on) a vehicle bed or storage tank through the inclusion of the discriminator 534 and sensor 510. The sensor 510 would be, prior to system 500 use/operations, be installed on the underside of a vehicle bed, on the frame of the bed at the rear of the vehicle, on (or under) the bed of a trailer attached behind the vehicle, or on an exterior surface of a storage tank (or on its inlet/outlet). Power 513 is supplied to the sensor 510 such as either by battery or via vehicle power wires (harvester 512) with optional power recharging from secondary sources (again, harvester 512).

During operations of the system 500 shown in FIG. 5 and of discriminator 534 in FIG. 6, the sensor 510 is configured to record (e.g., has memory or data storage onboard and processor managing such memory and storing activities) activity from the bed. This may include detecting movement, vibrations, impacts, and so on to indirectly identify when bulk material is being loaded or unloaded from the vehicle. This raw sensor data and/or sensor-processed data 516 is fed through a wired or wireless interface 520 to the telematics device 530 as shown at 528. The discriminator 534 then processes this sensor data including tying in additional information such as vehicle speed 666 at the time of the event, vehicle location 660 at the time of the event, location of vehicle 668 relative to geofences or points of interest shared by a remote service, the state of the PTO 664 that controls the bed position and/or gate state, and other information available to the telematics device 530.

This "tying" of additional information by the discriminator generally involves validating whether a true load or unload was detected by the sensor 510 corresponding to event/sensor data 516. For example, does the PTO state 666 correspond to a detected unload event or is PTO state indicative of a lowered and not moving bed. In another example, the discriminator 534 may determine that the vehicle speed is greater than a maximum load/unload speed such that the load/unload event 516 is not "true" or needs to be validated in a different manner. In some embodiments of system 500, the discriminator 534 is configured to interpret the data 516 received in connection 528 to identify the type of material loaded into (or unloaded from) the truck, and this can be compared by the discriminator 534 or by another component of system 500 (or dispatcher system) against ticketed information sent by a remote service.

Figure 7:
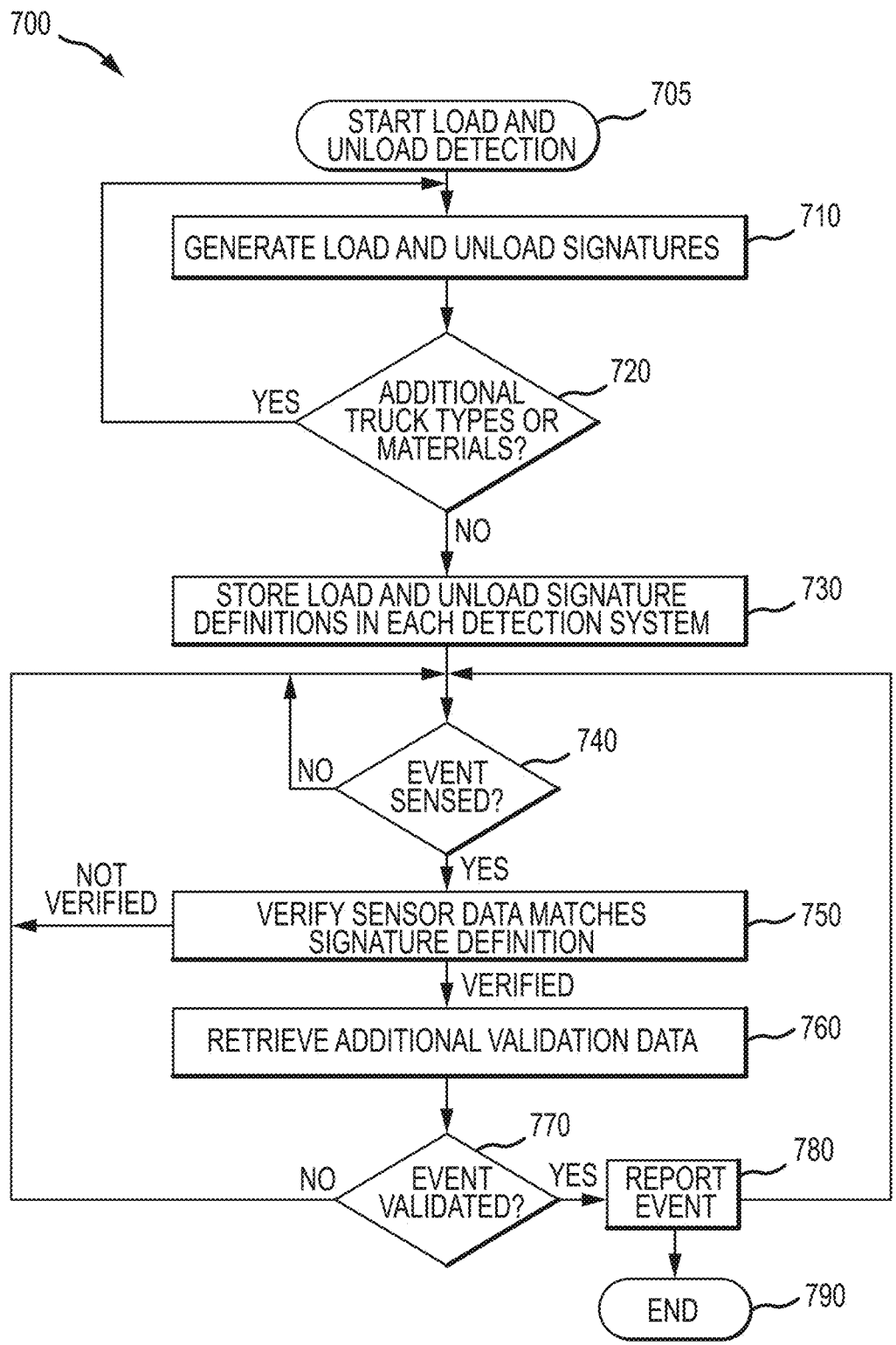
FIG. 7 is a flow diagram of a load and unload detection method as may be carried out by the systems and within the bulk material hauler vehicles with such systems described herein.

FIG. 7 is a flow diagram of a load and unload detection method 700 as may be carried out by the automated load and unload event detection systems and within the bulk material hauler vehicles with such systems described herein. The method 700 starts at 705 such as with selecting which vehicles the detection systems are to be used upon and which sensor-types and models are to be used in the detection systems as both of these variables may affect how events are identified by the system's software. Step 705 may also include installing a detection system upon each type of truck to be monitored.

The method 700 continues with step 710 with generating load signature definitions and unload signature definitions. Step 710 includes operating the sensor of a detection system on a vehicle during its typical hauling and delivery operations and then inspecting the sensor's data, i.e., its output signal and the signal's waveform during differing operations and during differing events. For example, sensor data as shown with graphs 300 and 400 of FIGS. 3 and 4 may be collected for a vehicle with a detection system. This allows a test operator or technician to determine the signal waveform during operations that are not associated with an event such as a swaying motion during idling or driving between sites and striking potholes. The signal waveform can also be inspected during known loading and unloading operations.

The operator may then define an unload signature and a load signature that is likely to be useful in identifying when load events occur and when unload events occur while differentiating other vehicle operations such as the swaying motion and impacts/vibrations of the bed associated with striking a pothole (shorter duration than load or unload).

These signatures may be defined for each type of material to be loaded and unloaded from the vehicle and for each loading and unloading method. Then, at step 720, the method 700 continues with determining whether there are different types/designs of vehicles to test to defined additional load and unload signatures as it may be the case that the load and/or unload signatures will be unique for each type of vehicle, e.g., a belly dump truck may have different signatures than a side or rear dump truck and both will differ from signatures defined for a storage-tank type hauler. If more types/designs of trucks, the method 700 continues at 710. Also, step 710 is typically repeated for differing bulk materials for each type/design of truck as the vibrations or other motions being sensed may differ between the materials.

When all signatures are defined in step 710, the method 700 continues at 730 with storing (or otherwise making available) the load and unload signature definitions in each vehicle's detection system (or at least the subset of signatures that are relevant to that particular vehicle and its intended uses). The method 700 then continues at 740 with event detection or sensing with the load and unload sensor mounted on a bed of a vehicle. If not sensed, the method 700 continues at 740. If an event is sensed by the sensor, the sensor typically will communicate its sensor data or output (e.g., a signal with waveforms like those seen in FIGS. 3 and 4). As discussed above, the sensor may be adjustable so that its sensitivity to vibration or other monitored motion can be set to filter out at least some of the operations or events that are not load or unload events such as the swaying motion of idling or driving the vehicle. In this way, the sensor can be configured to use less power by only transmitting its data/output signal when vibrations or other motions likely associated with a load or unload event are sensed.

When an event is sensed and sensor data transmitted to the telematics system and its detection module or software, the detection module acts at step 750 to verify the sensor data matches or satisfies one of the signature definitions from step 710. This may be a check to see that the waveform and its peaks/amplitudes exceed threshold levels or fall within amplitude ranges, and it may also involve a check to see if the waveform in the sensor output has a duration that matches or exceeds a minimum duration found in the signature definition. If so, the signature definition that is verified/matched in step 750 is used to identify the event that has occurred for the vehicle. This may be a load event or an unload event and each such event may also be linked to a specific bulk material (e.g., an unload event involving sand). If the detection module at step 750 cannot match the waveform in the sensor output/date to a signature definition, the sensed event may be considered a false positive for an event, and the method 700 may continue at 740 with ongoing monitoring with the sensor of the detection system.

If verified at step 750, the method 700 continues at 760 with retrieval of additional data useful for validating the identified event from step 750. For example, the additional data for the vehicle may include the vehicle's location at the time of the event, the vehicle's speed, PTO status, and a geofence status relative to the vehicle's location. This data can be processed to validate 770 whether the identified event is more likely than not to have occurred. In one detection module design, the speed must be found to be less than some maximum speed for a load or unload event to be validated. Similarly, validation may require that the vehicle's location match a planned load or unload site. Further or in the alternative, the PTO status may be used to see if the bed's operational status (bed up or down, gate open or closed, and so on) matches the event type.

If the event is not validated at 770, the method 700 may identify the event as a likely false event and continue at step 740 (or the falsely identified event may be reported as indicative of a sensor error or improper operation of the vehicle that needs to be checked by the driver or the mechanic). If the event is validated at 770, the method 700 continues at 780 with transmitting a message reporting the event such as to a dispatcher system or central fleet management hub. The method 700 then continues at 740 or ends at 790.

As discussed above, the telematics system of each vehicle may communicate with other vehicles, a network hub, and a network distribution center (dispatcher) as described in detail in U.S. Pat. No. 6,611,755, which is incorporated herein its entirety. The teaching of this patent facilitates vehicle tracking during bulk material hauling and delivery and events tracked as described herein (e.g., loading and unloading of bulk material) can be communicated through a vehicle tracking network as shown in this incorporated patent. This allows a fleet operator to locate vehicles with the load and unload detection systems in real time and to communicate with these vehicles with an efficient and reliable wireless network. Significantly, with the addition of the load and unload detection systems taught herein to each bulk material hauler vehicle, the communication system and techniques of this incorporated patent allow the operator to receive timely and accurate data (event reports and the like) regarding what each vehicle of the fleet is doing. The vehicle computer (in the telematics system) has interfaces to the load and unload sensor that indicate operations performed by the vehicle. Data provided by the sensors are processed by software algorithms in the computer to determine when load and unload events occur. The event, relevant parameters, and the time of the event are then transmitted through the wireless network to the fleet operator.

While this disclosure contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products. The above described embodiments including the preferred embodiment and the best mode of the invention known to the inventor at the time of filing are given by illustrative examples only.

Embodiments of the subject matter described in this specification can be implemented as one or more computer program products, i.e., one or more modules of computer program instructions encoded on a computer-readable medium for execution by, or to control the operation of, data processing apparatus. For example, the modules used to provide the application 234 and the like may be provided in such computer-readable medium and executed by a processor or the like. The computer-readable medium can be a machine-readable storage device, a machine-readable storage substrate, a memory device, a composition of matter affecting a machine-readable propagated signal, or a combination of one or more of them. The terms dispatcher system and driver's device encompass all apparatus, devices, and machines for processing data, including by way of example a programmable processor, a computer, or multiple processors or computers. The system (such as system 150 in FIG. 1 or system 230 of FIG. 2) can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, code, generator, module, manager, tool, and calculator) used to provide the functionality described herein (such as to generate an optimized trip plan, to calculate ETA or PTA, and to select alternative stops) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for performing instructions and one or more memory devices for storing instructions and data. The techniques described herein may be implemented by a computer system configured to provide the functionality described.

Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry. To provide for interaction with a user (with an I/O portion 152 to system 150 of FIG. 1 or the like), embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

We claim:

1. A system for automatically detecting an operational event for a bulk material hauler vehicle, comprising:
   a sensor mounted on a vehicle adapted for hauling bulk material; and
   a detection system comprising a processor and memory positioned on the vehicle, the processor executing code to provide a load and unload detection module,
   wherein the sensor senses vibration of a portion of the vehicle and communicates sensor data corresponding to the sensed vibration to the detection system,
   wherein the memory stores a load signature definition and an unload signature definition differing from the load signature definition,
   wherein the load and unload detection module processes the sensor data to identify a loading of the bulk material onto the vehicle when the sensor data satisfies the load signature definition and to identify an unloading of the bulk material from the vehicle when the sensor data satisfies the unload signature,
   wherein the bulk material is selected from a plurality of differing types of materials, and
   wherein the load and unload signature definitions differ for each of the differing types of materials.

2. The system of claim 1, wherein the vehicle is one of a plurality of differing types of vehicles, wherein the load and unload signature definitions differ for each of the differing types of vehicles, and wherein the differing types of vehicles are selected from the group consisting of an end dump truck, a side dump truck, a belly dump truck, a storage-tanker type truck, and a truck or a tractor having a trailer configured for an end dump, a side dump, a belly dump, or holding materials in a storage tank.

3. The system of claim 1, wherein the sensor data comprises a signal with a waveform and wherein the load and unload detection module compares the waveform to the load and unload signature definitions.

4. The system of claim 3, wherein the sensor senses vibration of a bed or storage tank of the vehicle, wherein the signature definitions each comprises a threshold amplitude of vibration over a minimum duration, and wherein the identifying of the loading or the unloading comprises determining the waveform has one or more amplitudes exceeding the threshold amplitude and that the waveform has a duration exceeding the minimum duration.

5. The system of claim 1, wherein the telematics system is mounted in a passenger cabin of a truck and wherein the sensor attached to a surface of a bed, a gate, a storage tank, or a trailer on or coupled to the truck.

6. A system for automatically detecting an operational event for a bulk material hauler vehicle, comprising:
 a sensor mounted on a vehicle; and
 a detection system comprising a processor positioned on the vehicle, the processor executing code to provide a load and unload detection module,
 wherein the sensor senses vibration of a portion of the vehicle and communicates sensor data corresponding to the sensed vibration to the detection system,
 wherein the load and unload detection module processes the sensor data to identify a loading of bulk material onto the vehicle when the sensor data satisfies a load signature definition and to identify an unloading of the bulk material from the vehicle when the sensor data satisfies an unload signature,
 wherein the vehicle is one of a plurality of differing vehicles,
 wherein the load and unload signature definitions differ for each of the differing vehicles,
 wherein the bulk material is selected from a plurality of differing types of materials, and
 wherein the load and unload signature definitions differ for each of the differing types of materials.

7. The system of claim 6, wherein the differing vehicles are selected from the group consisting of an end dump truck, a side dump truck, a belly dump truck, a storage-tanker type truck, and a truck or a tractor having a trailer configured for an end dump, a side dump, a belly dump, or holding materials in a storage tank.

8. The system of claim 6, wherein the sensor data comprises a signal with a waveform and wherein the load and unload detection module compares the waveform to the load and unload signature definitions.

9. The system of claim 8, wherein the sensor senses vibration of a bed or storage tank of the vehicle to generate the sensor data.

10. The system of claim 9, wherein the signature definitions each comprises a threshold amplitude of vibration over a minimum duration and wherein the identifying of the loading or the unloading of the bulk material comprises determining the waveform has one or more amplitudes exceeding the threshold amplitude and that the waveform has a duration exceeding the minimum duration.

11. The system of claim 6, wherein the sensor is attached to a surface of a bed, a gate, a storage tank, or a trailer of a truck.

12. A system for automatically detecting an operational event for a bulk material hauler vehicle, comprising:
 a sensor mounted on a vehicle adapted for hauling bulk material; and
 a detection system comprising a processor and memory positioned on the vehicle, the processor executing code to provide a load and unload detection module,
 wherein the sensor senses vibration of a portion of the vehicle and communicates sensor data corresponding to the sensed vibration to the detection system,
 wherein the memory stores a load signature definition and an unload signature definition,
 wherein the load and unload detection module processes the sensor data to identify a loading of the bulk material onto the vehicle based on the load signature definition or to identify an unloading of the bulk material from the vehicle based on the unload signature,
 wherein the sensor data comprises a signal with a waveform, and
 wherein the load and unload detection module compares the waveform to the load and unload signature definitions.

13. The system of claim 12, wherein the sensor senses vibration of a bed or storage tank of the vehicle, wherein the signature definitions each comprises a threshold amplitude of vibration over a minimum duration, and wherein the identifying of the loading or the unloading comprises determining the waveform has one or more amplitudes exceeding the threshold amplitude and that the waveform has a duration exceeding the minimum duration.

14. The system of claim 12, wherein the vehicle is one of a plurality of differing types of vehicles and wherein the load and unload signature definitions differ for each of the differing types of vehicles.

15. The system of claim 14, wherein the differing types of vehicles are selected from the group consisting of an end dump truck, a side dump truck, a belly dump truck, a storage-tanker type truck, and a truck or a tractor having a trailer configured for an end dump, a side dump, a belly dump, or holding materials in a storage tank.

16. The system of claim 12, wherein the bulk material is selected from a plurality of differing types of materials and wherein the load and unload signature definitions differ for each of the differing types of materials.

17. A truck including the system of claim 12, wherein the sensor is attached to a surface of a bed, a gate, a storage tank, or a trailer of the vehicle.

18. A system for automatically detecting an operational event for a bulk material hauler vehicle, comprising:
 a sensor mounted on a vehicle adapted for hauling bulk material; and
 a detection system comprising a processor and memory positioned on the vehicle, the processor executing code to provide a load and unload detection module,
 wherein the sensor senses vibration of a portion of the vehicle and communicates sensor data corresponding to the sensed vibration to the detection system,
 wherein the memory stores a load signature definition and an unload signature definition differing from the load signature definition,
 wherein the load and unload detection module processes the sensor data to identify a loading of the bulk material onto the vehicle when the sensor data satisfies the load signature definition and to identify an unloading of the bulk material from the vehicle when the sensor data satisfies the unload signature, and
 wherein the sensor data comprises a signal with a waveform and wherein the load and unload detection module compares the waveform to the load and unload signature definitions.

19. The system of claim 18, wherein the sensor senses vibration of a bed or storage tank of the vehicle, wherein the signature definitions each comprises a threshold amplitude of vibration over a minimum duration, and wherein the identifying of the loading or the unloading comprises determining the waveform has one or more amplitudes exceeding the threshold amplitude and that the waveform has a duration exceeding the minimum duration.

20. The system of claim 18, wherein the telematics system is mounted in a passenger cabin of a truck and wherein the sensor attached to a surface of a bed, a gate, a storage tank, or a trailer on or coupled to the truck.

21. The system of claim 18, wherein the vehicle is one of a plurality of differing types of vehicles, wherein the load and unload signature definitions differ for each of the differing types of vehicles, and wherein the differing types of vehicles are selected from the group consisting of an end dump truck, a side dump truck, a belly dump truck, a storage-tanker type truck, and a truck or a tractor having a trailer configured for an end dump, a side dump, a belly dump, or holding materials in a storage tank.

22. A system for automatically detecting an operational event for a bulk material hauler vehicle, comprising:
a sensor mounted on a vehicle; and
a detection system comprising a processor positioned on the vehicle, the processor executing code to provide a load and unload detection module,
wherein the sensor senses vibration of a portion of the vehicle and communicates sensor data corresponding to the sensed vibration to the detection system,
wherein the load and unload detection module processes the sensor data to identify a loading of bulk material onto the vehicle when the sensor data satisfies a load signature definition and to identify an unloading of the bulk material from the vehicle when the sensor data satisfies an unload signature,
wherein the vehicle is one of a plurality of differing vehicles,
wherein the load and unload signature definitions differ for each of the differing vehicles,
wherein the sensor data comprises a signal with a waveform, and
wherein the load and unload detection module compares the waveform to the load and unload signature definitions.

23. The system of claim 22, wherein the differing vehicles are selected from the group consisting of an end dump truck, a side dump truck, a belly dump truck, a storage-tanker type truck, and a truck or a tractor having a trailer configured for an end dump, a side dump, a belly dump, or holding materials in a storage tank.

24. The system of claim 22, wherein the sensor senses vibration of a bed or storage tank of the vehicle to generate the sensor data.

25. The system of claim 24, wherein the signature definitions each comprises a threshold amplitude of vibration over a minimum duration and wherein the identifying of the loading or the unloading of the bulk material comprises determining the waveform has one or more amplitudes exceeding the threshold amplitude and that the waveform has a duration exceeding the minimum duration.

26. A system for automatically detecting an operational event for a bulk material hauler vehicle, comprising:
a sensor mounted on a vehicle adapted for hauling bulk material; and
a detection system comprising a processor and memory positioned on the vehicle, the processor executing code to provide a load and unload detection module,
wherein the sensor senses vibration of a portion of the vehicle and communicates sensor data corresponding to the sensed vibration to the detection system,
wherein the memory stores a load signature definition and an unload signature definition,
wherein the load and unload detection module processes the sensor data to identify a loading of the bulk material onto the vehicle based on the load signature definition or to identify an unloading of the bulk material from the vehicle based on the unload signature,
wherein the bulk material is selected from a plurality of differing types of materials, and
wherein the load and unload signature definitions differ for each of the differing types of materials.

27. The system of claim 26, wherein the sensor data comprises a signal with a waveform and wherein the load and unload detection module compares the waveform to the load and unload signature definitions.

28. The system of claim 27, wherein the sensor senses vibration of a bed or storage tank of the vehicle, wherein the signature definitions each comprises a threshold amplitude of vibration over a minimum duration, and wherein the identifying of the loading or the unloading comprises determining the waveform has one or more amplitudes exceeding the threshold amplitude and that the waveform has a duration exceeding the minimum duration.

29. The system of claim 26, wherein the vehicle is one of a plurality of differing types of vehicles, wherein the load and unload signature definitions differ for each of the differing types of vehicles, and wherein the differing types of vehicles are selected from the group consisting of an end dump truck, a side dump truck, a belly dump truck, a storage-tanker type truck, and a truck or a tractor having a trailer configured for an end dump, a side dump, a belly dump, or holding materials in a storage tank.

* * * * *